United States Patent [19]

Andresen et al.

[11] Patent Number: 5,135,709

[45] Date of Patent: Aug. 4, 1992

[54] METHOD FOR REDUCING CORROSION OF COMPONENTS EXPOSED TO HIGH-TEMPERATURE WATER

[75] Inventors: Peter L. Andresen; Leonard W. Niedrach, both of Schenectady, N.Y.

[73] Assignee: General Electric Company, Schenectady, N.Y.

[21] Appl. No.: 698,885

[22] Filed: May 13, 1991

[51] Int. Cl.$^5$ .............................................. G21C 9/00
[52] U.S. Cl. .................................... 376/305; 376/306
[58] Field of Search ................ 376/300, 301, 305, 306

[56] References Cited

U.S. PATENT DOCUMENTS

| | | | |
|---|---|---|---|
| 3,343,979 | 10/1967 | Hamrin | 117/100 |
| 3,783,005 | 1/1974 | Kenney et al. | 117/212 |
| 4,097,402 | 6/1978 | Grabb | 252/301.1 |
| 4,123,594 | 10/1978 | Chang | 428/651 |
| 4,477,538 | 10/1984 | Clarke | 428/656 |
| 4,842,811 | 6/1989 | Desilva | 376/301 |
| 4,917,968 | 4/1990 | Tuffias et al. | 428/621 |

FOREIGN PATENT DOCUMENTS

| | | |
|---|---|---|
| 0145262 | 6/1985 | European Pat. Off. |
| 0235954 | 3/1987 | European Pat. Off. |
| 1210496 | 2/1966 | Fed. Rep. of Germany |

OTHER PUBLICATIONS

"Increasing the Passivability and Corrosion Resistance of Stainless Steels by Surface Alloying with Palladium", Chernova, G. P. et al., Plenum Publishing Corporation, UDC 620.197.3 (1982) pp. 406-411.

"Protective Coatings for Radiation Control in Boiling Water Nuclear Power Reactors", T. V. Rao, R. W. Vook, W. Meyer, and C. Wittwer, J. Vac. Sci. Technol. A 5(4) (Jul./Aug. 1987) pp. 2701-2705.

"Palladium Impedes Radionuclide Pick-Up in Steel", Platinum Met. Rev., Oct. 1989, vol. 33(4), p. 185.

"Thin Films to Impede the Incorporation of Radionuclides in Austenitic Stainless Steels", H. Ocken, C. C. Lin, D. H. Lisher, vol. 171, 1989, pp. 323-334.

"Hydrogen Water Chemistry Technology for BWRs", J. N. Kass, R. L. Cowan, Proceedings of the Second International Symposium on Environmental Degradation of Materials in Nuclear Power Systems-Water Reactors, American Nuclear Society, 1986, pp. 211-217.

"Water Chemistry of Nuclear Power Plants", W. T. Lindsey, Jr., Proceedings of the Second International Symposium on Environmental Degradation of Materials in Nuclear Power Systems-Water Reactors, American Nuclear Society, 1986, pp. 203-210.

"Platinum Metals in Stainless Steels", I. R. McGill, Platinum Metals Review, 1990, vol. 34(2), pp. 85-97.

"Alloying Stainless Steels with the Platinum Metals", M. A. Streicher, Platinum Metals Review, 1977, vol. 21, pp. 51-55.

"Development of Pitting Resistant Fe-Cr-Mo Alloys", M. S. Streicher, Corrosion-Nace, vol. 30, No. 3, Mar. 1974, pp. 77-91.

"Increasing the Passivation Ability and Corrosion Resistance of Chromium Steel by Surface Alloying with Palladium", G. P. Chernova, T. A. Fedoseeva, L. P. Kornienko, N. D. Tomashov, Surface Technology, vol. 13, 1981, pp. 241-256.

"Deposition and Characterization of Electroless Palladium on Austenitic Stainless Steel" H. Ocken, B. G. Pound, D. H. Lister, Thin Solid Films, vol. 177, 1989, pp. 313-322.

"Effect of Palladium Coatings on the Corrosion Potential of Stainless Steel in High-Temperature Water Containing Dissolved Hydrogen and Oxygen", L. W. Niedrach, Corrosion, vol. 47, No. 3, Mar. 1991, pp. 162-169.

Primary Examiner—Brooks H. Hunt
Assistant Examiner—Frederick H. Voss
Attorney, Agent, or Firm—James E. McGinness; James C. Davis, Jr.; James Magee, Jr.

[57] ABSTRACT

A method for lowering the corrosion potential on components formed from carbon steel, alloy steel, stainless steel, nickel based alloys, or cobalt based alloys, and exposed to high-temperature water comprised of oxidizing species, comprising: providing a reducing species in the high temperature water that can combine with the oxidizing species, and forming the component to have a catalytic layer of a platinum group metal.

9 Claims, 9 Drawing Sheets

METHOD FOR REDUCING CORROSION OF COMPONENTS EXPOSED TO HIGH-TEMPERATURE WATER

CROSS-REFERENCE TO RELATED APPLICATION

This application relates to copending applications Ser. No. 07/502,721, filed Apr. 2, 1990; and Ser. No. 07/502,720, filed Apr. 2, 1990, both incorporated herein by reference.

BACKGROUND OF THE INVENTION

This invention relates to reducing the corrosion potential of components exposed to high-temperature water. As used herein, the term "high-temperature water" means water of about 150° C. or greater, steam, or the condensate thereof.

High-temperature water can be found in a variety of known apparatus, such as water deaerators, nuclear reactors, and in steam driven central station power generation.

Nuclear reactors are used in central-station electric power generation, research, propulsion, and for dual purposes thereof. A reactor pressure vessel contains the reactor coolant, i.e. water, which removes heat from the nuclear core. Piping circuits carry the heated water or steam to the steam generators or turbines, and circulated water or feedwater back to the vessel. Operating pressures and temperatures for the reactor pressure vessel are about 7 MPa and 288° C. for a boiling water reactor, and about 15 MPa and 320° C. for a pressurized water reactor. The materials used in both boiling water and pressurized water reactors must withstand various loading, environmental and radiation conditions.

Some of the materials exposed to the high-temperature water, steam, or condensate thereof include carbon steel, alloy steel, stainless steel, nickel-base alloys, and cobalt-base alloys. Additional information about such materials can be found in the Metals Handbook Desk Edition, American Society for Metals, 1985, with carbon and alloy steels at pp. 4.1–4.94, stainless steels and nickel-based alloys at pp. 15.1–15.30, and cobalt-base alloys at pp. 17.8–17.10, all incorporated herein by reference. Despite the careful selection and treatment of these materials for use in the systems, corrosion occurs on the materials exposed to the high-temperature water. Such corrosion contributes to a variety of problems, e.g., stress corrosion cracking, sticking of pressure relief valves, buildup of the gamma radiation emitting isotope $^{60}$cobalt, and erosion corrosion.

Stress corrosion cracking is a known phenomenon occurring in the components, including structural members, piping, fasteners, and weld deposits, of apparatus exposed to high-temperature water. For example, the components in nuclear reactors exposed to high-temperature water are known to undergo stress corrosion cracking. As used herein, the term "stress corrosion cracking" means cracking propagated by static or dynamic stressing in combination with corrosion at the crack tip. The reactor components are subject to a variety of stresses associated with, e.g., differences in thermal expansion, the operating pressure needed for the containment of the reactor cooling water, and other sources including residual stress from welding, cold work and other asymmetric metal treatments. In addition, water chemistry, welding, heat treatment, and radiation can increase the susceptibility of a component to stress corrosion cracking of the metal. The factors that lead to stress corrosion cracking have been widely studied and a number of papers have been written concerning it.

Some of the publications addressing stress corrosion cracking and incorporated by reference herein are:

1) F. P. Ford, "Stress Corrosion Cracking", in *Corrosion Processes*, edited by R. N. Parkins, Applied Science Publishers, New York, 1982, p. 271.

2) J. N. Kass and R. L. Cowan, "Hydrogen Water Chemistry Technology for BWRs", in *Proc. 2nd Int. Conf. on Environmental Degradation of Materials in Nuclear Power Systems--Water Reactors*, Monterey, Calif., 1985, p. 211.

3) M. E. Indig, B. M. Gordon, R. B. Davis and J. E. Weber, "Evaluation of In-Reactor Intergranular Stress" in *Proc. 2nd Int. Conf. on Environmental Degradation of Materials in Nuclear Power Systems - Water Reactors*, Monterey, Calif., 1985, p. 411.

4) F. P. Ford, P. L. Andresen, H. D. Solomon, G. M. Gordon, S. Ranganath, D. Weinstein, and R. Pathania, "Application of Water Chemistry Control, On-Line Monitoring and Crack Growth Rate Models for Improved BWR Materials Performance", *Proc. Fourth International Symposium on Environmental Degradation of Materials in Nuclear Power Systems - Water Reactors*, Jekyll Island, Ga., August 1989, Nace, Houston, pp 4–26 to 4–51, 1990.

5) L. W. Niedrach and W. H. Stoddard, "Corrosion Potentials and Corrosion Behavior of AISI304 Stainless Steel In High Temperature Water Containing Both Dissolved Hydrogen and Oxygen", *Corrosion*, Vol 42, No. 12 (1986) page 696.

It is well documented that stress corrosion cracking occurs at higher rates when oxygen is present in the reactor water in concentrations of about 5 parts per billion, ppb, or greater. Stress corrosion cracking is further increased in a high radiation flux where oxidizing species, such as oxygen, hydrogen peroxide, and short-lived radicals are produced from radiolytic decomposition of the reactor water. Such oxidizing species increase the electrochemical corrosion potential of metals. Electrochemical corrosion is caused by a flow of electrons from anodic and cathodic areas on metallic surfaces. The corrosion potential is a measure of the thermodynamic tendency for corrosion phenomena to occur, and is a fundamental parameter in determining rates of, e.g., stress corrosion cracking, corrosion fatigue, corrosion film thickening, and general corrosion.

As explained in these and other articles, stress corrosion cracking in boiling water nuclear reactors and the associated water circulation piping has been reduced by injecting hydrogen in the water circulated therein. The injected hydrogen reduces oxidizing species in the water, such as dissolved oxygen, and as a result lowers the corrosion potential of metals in the water. However, factors such as variations in water flow rates and the time or intensity of exposure to neutron or gamma radiation result in the production of oxidizing species at different levels in different reactors. Thus, varying amounts of hydrogen have been required to reduce the level of oxidizing species sufficiently to maintain the corrosion potential below a critical potential required for protection from the stress corrosion cracking in the high-temperature water.

As used herein, the term, "critical potential" means a corrosion potential at or below a range of values of about −230 to −300 mV based on the standard hydrogen electrode (she) scale. Below the critical potential, stress corrosion cracking is markedly reduced or even eliminated as disclosed in references 2-5. Stress corrosion cracking proceeds at an accelerated rate in systems in which the electrochemical potential is above the critical potential, and at a substantially lower rate in systems in which the electrochemical potential is below the critical potential. Water containing oxidizing species such as oxygen increases the corrosion potential of metals exposed to the water above the critical potential, while water with little or no oxidizing species present results in corrosion potentials below the critical potential.

Corrosion potentials of stainless steels in contact with reactor water containing oxidizing species can be reduced below the critical potential by injection of hydrogen into the water in a concentration of about 50 to 100 ppb or greater. Much higher hydrogen injection levels are necessary to reduce the corrosion potential within the high radiation flux of the reactor core, or when oxidizing cationic impurities, e.g., cupric ion are present. Such hydrogen injection lowers the concentration of dissolved oxidizing species in the water and also the corrosion potential of the metal. However, high hydrogen additions, for example of about 150 ppb or greater, that reduce the corrosion potential below the critical potential can result in a higher radiation level in the steam driven turbine section from incorporation of the short-lived $N^{16}$ species. The higher radiation requires additional shielding, and radiation exposure control.

Accordingly, although the addition of hydrogen lowers the corrosion potential of reactor water, it is also desirable to limit the amount of hydrogen in reactor water, while maintaining the corrosion potential below the critical potential.

Two disclosures dealing with the formation of noble metal deposits on stainless steel are:

(6) H. Ocken, C. C. Lin, and D. H. Lister, "Thin Films to Impede the Incorporation of Radio Nucleides in Austenetic Stainless Steels", *Thin Solid Films*, Vol. 171 (1989) pages 323-334.

(7) G. P. Chernova, T. A. Fedosceva, L. P. Kornienko, and N. D. Tomashov, "Increasing Passivation Ability and Corrosion Resistance of Stainless Steel by Surface Alloying with Palladium", *Prot. Met.* (Eng. Transl.) 17 (1981) page 406.

The first of these disclosures deals with the use of pre-oxidation treatments and metallic films to reduce the incorporation of $^{60}Co$ in components of the circulatory system of a nuclear reactor that are in contact with the coolant. An electroless deposit of palladium was found to be most effective in reducing incorporation of $^{60}Co$ in stainless steel exposed to simulated primary water coolant conditions, i.e., water that is not injected with hydrogen.

The second disclosure deals with the electrochemical behavior and increase in corrosion potential and passivation of stainless steel that is surface alloyed with palladium, and exposed to deaerated acidic solutions at room temperature. The increased corrosion potential causes a passive oxide layer to form on the stainless steel that reduces further corrosion.

One object of this invention is to provide a method for reducing corrosion of a component exposed to high-temperature water.

Another object is to provide a method for reducing stress corrosion cracking of a component exposed to high-temperature water.

Another object is to provide a method for reducing corrosion by lowering the corrosion potential of a component exposed to high-temperature water.

Another object is to provide a method for reducing the amount of hydrogen injected into high-temperature water to reduce the corrosion potential of a component exposed to high-temperature water.

BRIEF DESCRIPTION OF THE INVENTION

We have discovered that components formed from carbon steel, alloy steel, stainless steel, nickel-based alloys, or cobalt-based alloys and having a substantially increased corrosion potential in high-temperature water comprised of oxidizing species such as oxygen or hydrogen peroxide, can be lowered in corrosion potential by a catalytic layer of a platinum group metal on the component. As used herein, the term "catalytic layer" means a coating on a substrate, or a solute in an alloy formed into the substrate, the coating or solute being sufficient to catalyze combination of oxidizing and reducing species at the surface of the substrate. As used herein, the term "platinum group metal" means metals from the group consisting of platinum, palladium, osmium, ruthenium, iridium, rhodium, and mixtures thereof.

The method of this invention lowers the corrosion potential of components formed from an alloy from the group consisting of carbon steel, alloy steel, stainless steel, nickel-based alloys, and cobalt-based alloys, and exposed to high-temperature water comprised of oxidizing species such as oxygen or hydrogen peroxide that substantially increase the corrosion potential of the components. In nuclear reactors, corrosion potential is further increased by higher levels of oxidizing species, e.g., up to 200 ppb or greater of oxygen in the water, from the radiolytic decomposition of water in the core of the nuclear reactor. The method comprises providing a reducing species in the high-temperature water that can combine with the oxidizing species, and forming the component to have a catalytic layer of a platinum group metal that lowers the corrosion potential of the component below the critical potential when exposed to the water.

DETAILED DESCRIPTION OF THE INVENTION

Figure 1:
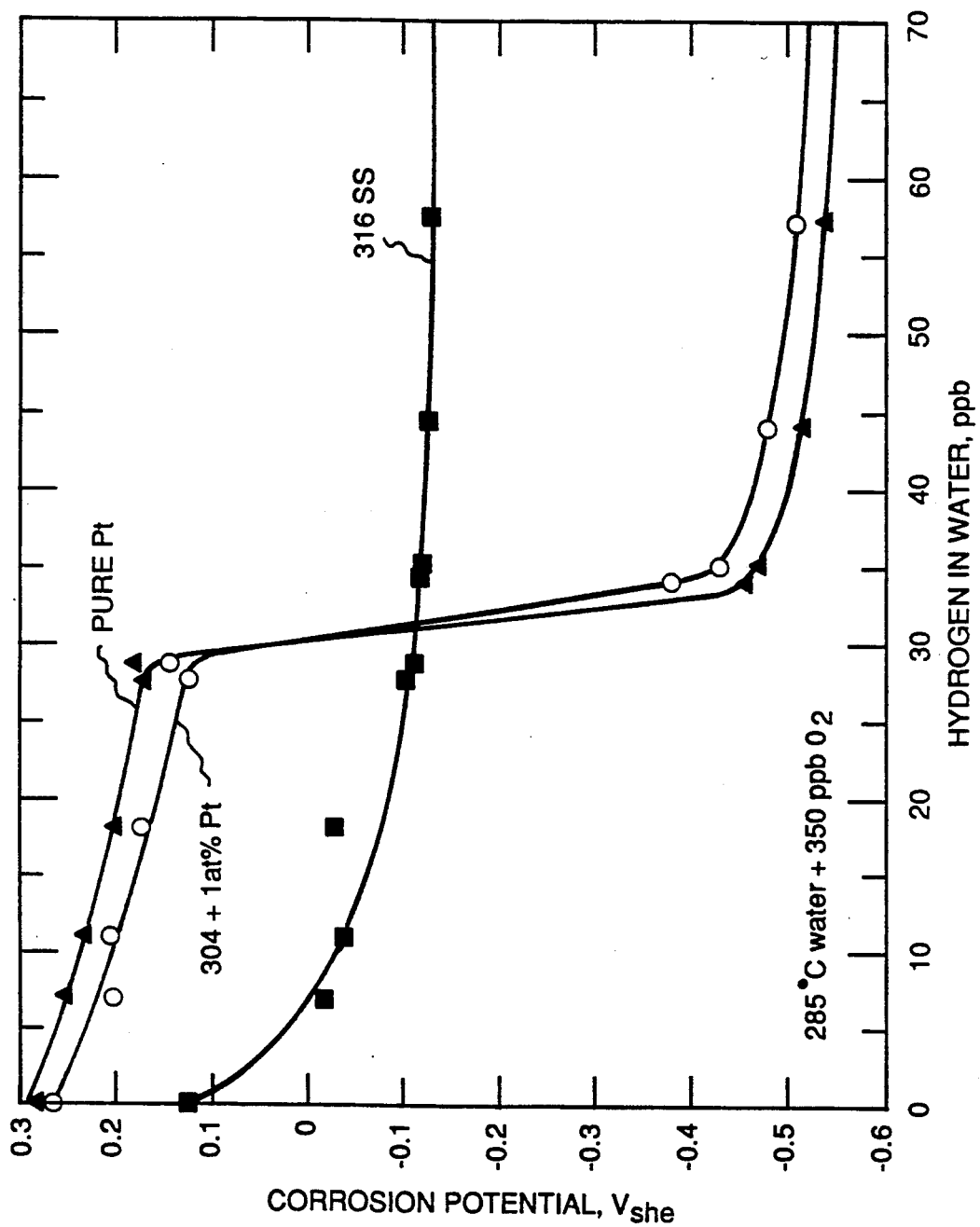
FIG. 1 is a graph of the corrosion potential of samples of pure platinum, stainless steel, and stainless steel comprised of 1 atomic percent platinum in water at 285° C. with 350 parts per billion oxygen plotted against increasing hydrogen concentration in the water.

It is known that hydrogen can be added to the feed water of nuclear reactors to decrease the electrochemical potential of components exposed to the water, and thereby reduce the incidence of stress corrosion cracking, corrosion, and incorporation of $^{60}$cobalt in the components. High concentrations of hydrogen, of about 100 parts per billion or more, must be added to provide adequate protection to materials out of the reactor core, and still higher concentrations are needed to afford protection to materials in the reactor core. It is also known that platinum or palladium can be added to increase the corrosion potential of stainless steel exposed to deaerated acidic aqueous solutions, thereby forming a passive oxide layer on the stainless steel and reducing further corrosion.

We have found that a catalytic layer of a platinum group metal on an alloy from the group consisting of carbon steel, alloy steel, stainless steel, nickel-based alloys, and cobalt-based alloys, catalyzes the combination of reducing species, such as hydrogen, with oxidizing species, such as oxygen or hydrogen peroxide, that are present in the water. Such catalytic action at the surface of the alloy can lower the corrosion potential of the alloy below the critical corrosion potential where stress corrosion cracking is minimized. As a result, the efficacy of hydrogen additions to high-temperature water in lowering the electrochemical potential of components made from the alloy and exposed to the injected water is increased many fold.

We have discovered that it is possible to provide catalytic activity at metal alloy surfaces if the metal substrate of such surfaces contains a catalytic layer of a platinum group metal. Further, we have found that relatively small amounts of the platinum group metal are sufficient to provide the catalytic layer and catalytic activity at the surface of the metal substrate. For example, we have found that a solute in an alloy of at least about 0.01 weight percent, preferably at least 0.1 weight percent provides a catalytic layer sufficient to lower the corrosion potential of the alloy below the critical potential. The solute of a platinum group metal can be present up to an amount that does not substantially impair the metallurgical properties, including strength, ductility, and toughness of the alloy. The solute can be provided by methods known in the art, for example by addition to a melt of the alloy, or by surface alloying as shown for example in the reference cited above Increasing the Passivation Ability and Corrosion Resistance of Chromium Steel by Surface Alloying With Palladium," and incorporated herein by reference.

In addition, a coating of the platinum group metal, or a coating of an alloy comprised of a solute of the platinum group metal as described above, provides a catalytic layer and catalytic activity at the surface of the metal. The catalytic activity can provide a lowering of corrosion potential over coating discontinuities by reducing oxidants over the exposed areas. It is believed that coating discontinuities leaving exposed metal surface up to about 100 microns from the nearest coating are protected by the catalytic layer. Suitable coatings can be deposited by methods well known in the art for depositing continuous or substantially continuous coatings on metal substrates, such as; plasma spraying, flame spraying, chemical vapor deposition, physical vapor deposition processes such as sputtering, welding such as metal inert gas welding, electroless plating, and electrolytic plating. Additional information about such coating processes can be found, for example in, "Metallic & Ceramic Coatings: Production, High Temperature Properties & Applications," M. G. Hocking, V. Vasantasree, P. S. Sidky, Longman Scientific & Technical, Essex England, 1989, incorporated herein by reference.

Because very small surface concentrations are adequate to provide the catalytic layer and reduce the corrosion potential of the metal, the processing, physical metallurgical or mechanical properties of the alloys, and components formed therefrom are not significantly altered. Lower amounts of reducing species such as hydrogen are effective to reduce the corrosion potential of the metal components below the critical potential, because the efficiency of combination of oxidizing and reducing species is increased many fold by the catalytic layer. For example, the corrosion potential of a metal component having a catalytic layer of a platinum group metal, and exposed to water comprised of 200 ppb oxygen can be reduced below the critical potential by the addition of about 25 ppb hydrogen to the water. In contrast, the corrosion potential of a metal component exposed to water comprised of 200 ppb oxygen, the component not having a catalytic layer of a platinum group metal, can be reduced below the critical potential by the addition of about 100 ppb hydrogen to the water, i.e., an increase of 400 percent in hydrogen that must be added to the water.

Reducing species that can combine with the oxidizing species in the high temperature water are provided by conventional means known in the art, for example, see "Water Chemistry of Nuclear Power Plants", W. T. Lindsay, Jr., Proceeding Second International Conference on Environmental Degradation of Materials in Nuclear Power Systems-Water Reactors, Monterey, Calif., 1985, pp. 203–210, incorporated herein by reference. Briefly described, reducing species such as hydrogen, ammonia, or hydrazine are injected into the feedwater of the nuclear reactor. Reducing species are also provided within the core of a nuclear reactor by the radiolytic decomposition of water. Therefore, within the reactor core enough hydrogen may be produced by the radiolytic decomposition of water to lower the corrosion potential below the critical potential in combination with the catalytic activity provided by the catalytic layer of a platinum group metal on components within the reactor core. Recirculated core water can be sampled to determine the level of hydrogen provided by such radiolytic decomposition. If necessary, additional hydrogen is injected in the feed water of the nuclear reactor to reduce the corrosion potential of the components exposed to the high-temperature water below the critical potential.

Though not meant to be a complete list, Table 1 below gives typical compositions for some of the carbon steel, alloy steel, stainless steel, nickel-based alloys, and cobalt-based alloys exposed to high-temperature water in apparatus such as nuclear reactors, steam driven power generator systems, and deaerators.

TABLE 1

| | Corrosion Resistant Alloys Typical Composition (Weight %) | | | | | | | |
|---|---|---|---|---|---|---|---|---|
| | Cr | Mn | Mo | Si | C | Ni | Fe | Co Comments |
| Carbon Steel | | | | | | | | |
| A333-6 - | | 1.0 | — | 0.2 | 0.2 | — | Bal. | |
| Alloy Steel | | | | | | | | |
| A533 B | 0.2 | 1.2 | 0.5 | 0.25 | 0.2 | 0.6 | Bal. | |
| A508 | 0.2 | 1.4 | 0.5 | 0.25 | 0.2 | 0.8 | Bal. | |
| Stainless Steel | | | | | | | | |
| 304 | 18.5 | 1.2 | — | 0.5 | 0.04 | 9 | Bal. | 304L 0.03 Max C |
| | | | | | | | | 304LN 0.03 Max C, 0.1 N |
| 316 | 17.5 | 1.2 | 2.2 | 0.5 | 0.04 | 11 | Bal. | 316L 0.03 Max C |
| | | | | | | | | 316LN 0.03 Max C, 0.1 N |
| 321 | 18 | 1.2 | — | 0.5 | 0.03 | 10 | Bal. | +Ti 5 × C min |
| 347 | 18 | 1.2 | — | 0.5 | 0.03 | 10 | Bal. | +Cb—Ta 10 × C min |
| Nickel-Base Alloy | | | | | | | | |
| Inconel 600 | 16 | 0.2 | — | 0.2 | 0.4 | Bal. | 7.2 | |
| Inconel Alloy X750 | 15 | 0.7 | — | 0.3 | 0.04 | Bal. | 6.8 | 3.7 Nb, 2.5 Ti, 0.8 Al |
| Cobalt-Base Alloy | | | | | | | | |
| Stellite 6B | 28–32 | 2.0 Max | 1.5 Max | 2.0 Max | 0.9–1.4 | 3.0 Max | 3.0 Max | Bal. 3.5–5.5 W |

Components formed from carbon steel, alloy steel, stainless steel, nickel-based alloys, and cobalt-based alloys, for example in Table 1 or disclosed in the Metals Handbook discussed above, are improved in resistance to stress corrosion cracking by the method of this invention. The presence of a catalytic layer of the platinum group of metals on the components exposed to high-temperature water comprised of oxidizing species is effective in lowering the corrosion potential at the surface and thereby in reducing the stress corrosion cracking which emanates from the surface. The catalytic layer is effective at low hydrogen concentrations, i.e., about the ratio of oxygen to hydrogen that forms water, that are below the levels of hydrogen injection previously known for lowering the corrosion potential of metal components below the critical potential. This is now referred to as catalyzed hydrogen water chemistry.

Thus, although it is known that the conventional injection of higher concentrations of hydrogen into the high-temperature water can be effective in reducing stress corrosion cracking, it has now also been found that the effectiveness of the hydrogen in this role is limited by the sluggish reaction and combination of hydrogen and oxygen to form water. What has now been found and demonstrated experimentally through catalyzed hydrogen water chemistry is that an improvement in the rate of combination of hydrogen and oxygen on components exposed to high-temperature water can be achieved at reduced concentrations of hydrogen, by increased catalytic activity at the surface of the components. The catalytic layer of a platinum group metal reduces the corrosion potential of the metal below the critical potential, even with the presence of higher oxygen concentrations than can be tolerated in the absence of the catalyst.

Further, it has now been found, through catalyzed hydrogen water chemistry, that potentials below the critical potential can be achieved with lower concentrations of hydrogen than have been needed and have been used in the prior art hydrogen water chemistry without the catalytic layer. Thus, what has now been recognized is that the low corrosion potentials which are the objectives of the conventional hydrogen water chemistry efforts to reduce stress corrosion cracking can be achieved in the presence of relatively high oxygen concentrations by the catalytic activity at the metal surface coupled with the presence of lower concentrations of hydrogen in the water. It has now been discovered that it is possible to achieve the lower corrosion potentials more efficiently and with less hydrogen than in the absence of the catalytic layer.

Some of the features and advantages of catalyzed hydrogen water chemistry are further shown by the following examples.

EXAMPLE 1

Test samples were prepared by melting 1.03 or 20 kilogram charges comprised of, in weight percent about 18 percent chromium, 9.5 percent nickel, 1.2 percent manganese, 0.5 percent silicon, and platinum or palladium ranging from about 0.01 to 3.0 percent as shown in Table 2 below. The composition of the test samples is similar to the composition of 304 stainless steel in Table 1, but are further comprised of the platinum or palladium solute. The charges were vacuum arc melted as cylindrical ingots about 2.1 centimeters long by 8 centimeters in diameter, or vacuum induction melted and poured into ingots having a 10 centimeter tapered square cross section, and about 30 centimeters in length. The ingots were homogenized at 1200° C. for 16 hours, forged at 1000° C. to a thickness of about 1.9 centimeters, and hot rolled at 900° C. in two passes to final dimensions of about 10 centimeters in diameter by 1.2 centimeters thick. Test specimens were fabricated by electro-discharge machining rods about 0.3 centimeter in diameter by 6 centimeters long from the samples. The test specimens were wet ground using 600 grit paper to remove the re-cast layer produced by the electro-discharge machining.

TABLE 2

Chemical Composition of 304 Stainless Steel Samples With Palladium or Platinum Addition

| Sample No. | Cr | Ni | Mn | Si | Pt | Pd |
|---|---|---|---|---|---|---|
| 1. | 18 | 9.5 | 1.2 | 0.5 | | 0.01 |
| 2. | 18 | 9.5 | 1.2 | 0.5 | | 0.035 |
| 3. | 18 | 9.5 | 1.2 | 0.5 | | 0.1 |
| 4. | 18 | 9.5 | 1.2 | 0.5 | | 0.35 |
| 5. | 18 | 9.5 | 1.2 | 0.5 | | 1.0 |
| 6. | 18 | 9.5 | 1.2 | 0.5 | | 3.0 |
| 7. | 18 | 9.5 | 1.2 | 0.5 | 0.035 | |
| 8. | 18 | 9.5 | 1.2 | 0.5 | 0.1 | |
| 9. | 18 | 9.5 | 1.2 | 0.5 | 0.35 | |
| 10. | 18 | 9.5 | 1.2 | 0.5 | 1.0 | |
| 11. | 18 | 9.5 | 1.2 | 0.5 | 3.0 | |

A test specimen prepared from sample number 10 in Table 2 was welded to a Teflon insulated 0.76 millimeter stainless steel wire and mounted in a Conax fitting for placement in an autoclave. The test specimen mounted on a Conax fitting was transferred to an autoclave in a test loop which had been set up for a series of water chemistry studies. The Conax mounted coupon was placed in the autoclave along with a specimen of 316 stainless steel, and a platinum reference electrode specimen. A pump circulated water through the autoclave. The system was brought to a temperature between 280° and 285° C., 1200 psig. pressure, and water containing 350 ppb (parts per billion) of dissolved oxygen was circulated to flow over the specimens at a flow rate of 200 milliliters per minute. After two to three days of operation potential readings were taken and hydrogen was gradually introduced into the water at increasing concentrations over a period of days.

Corrosion potential measurements using a zirconia reference electrode as described in L. W. Niedrach and N. H. Stoddard, *Corrosion* Vol. 41, No. 1 (1985) page 45, were made and data was plotted on a graph as depicted in FIG. 1. FIG. 1 is a graph in which the electrical potential is plotted against the concentration of hydrogen in the test water in parts per billion. The potentials of the specimens and the platinum electrode, converted to the standard hydrogen electrode (SHE) scale, are shown as the three separate plots representing the three different specimens on FIG. 1. As indicated by the legend, the filled squares correspond to the electrical potential of the 316 stainless steel sample with no palladium; the filled triangles to the platinum reference electrode; and the open circles to the stainless steel specimens comprised of 1 atomic percent platinum.

The yield strength, tensile strength, and percentage elongation for samples 1, 3, 4 and 7 were measured in accordance with ASTM E 8 "Standard Test Methods of Tension Testing of Metallic Materials," 1990 Annual Book of ASTM Standards, Vol. 3.01, and are shown in Table 3 below. Typical tensile properties for 304 stainless steel are shown in Table 3 for comparison.

TABLE 3

Tensile Properties of 304 Stainless Steel With Platinum or Palladium Addition

| Sample No. | Pt | Pd | Y.S. (ksi) | U.T.S. (ksi) | El (%) | Comments |
|---|---|---|---|---|---|---|
| 1. | | 0.01 | 37.9 | 87.4 | 45.6 | |
| 3. | 0.035 | | 26.8 | 87.8 | 65.6 | |
| 4. | | 0.1 | 31.1 | 89.7 | 55.1 | |
| 5. | | 0.35 | 37.7 | 89.4 | 59.4 | |
| 304 SS | | | 35 | 82 | 60 | Typical Tensile Properties |

EXAMPLE 2

Figure 2:
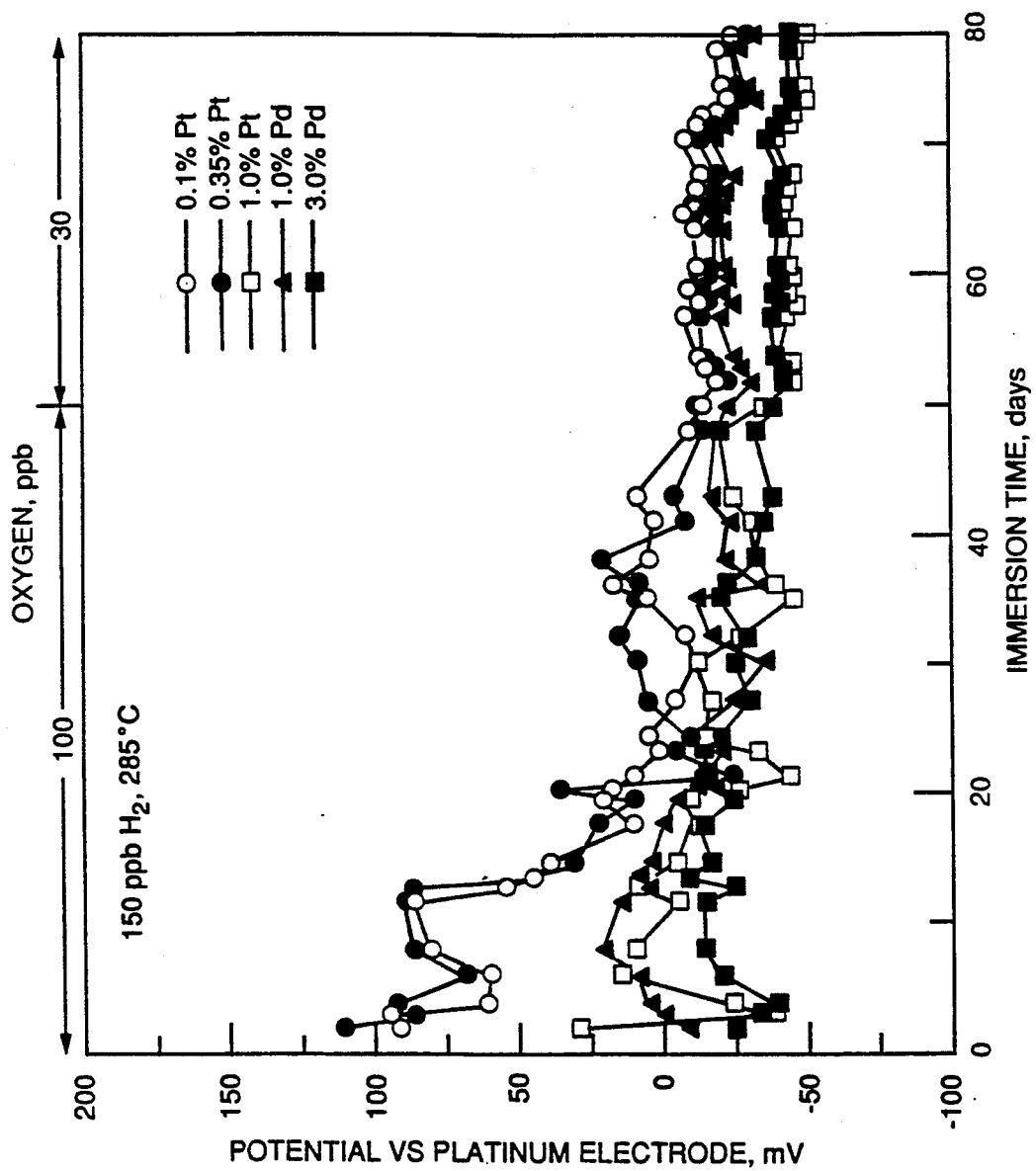
FIG. 2-4 are graphs of the corrosion potential of samples of stainless steel comprised of a platinum or palladium solute versus a platinum electrode in water at 285° C. with 150 parts per billion hydrogen plotted over a period of time.
Figure 3:
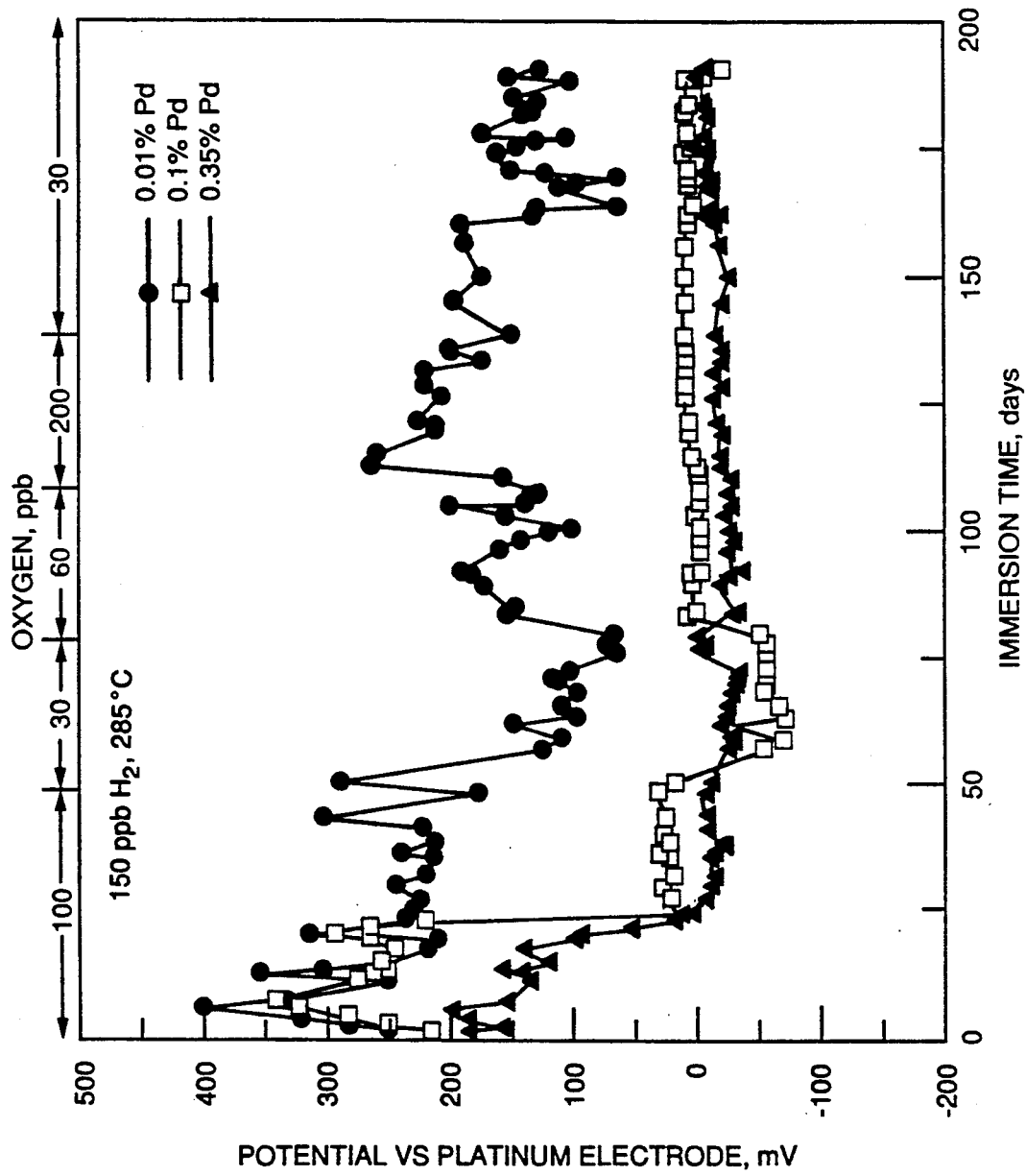
Figure 4:
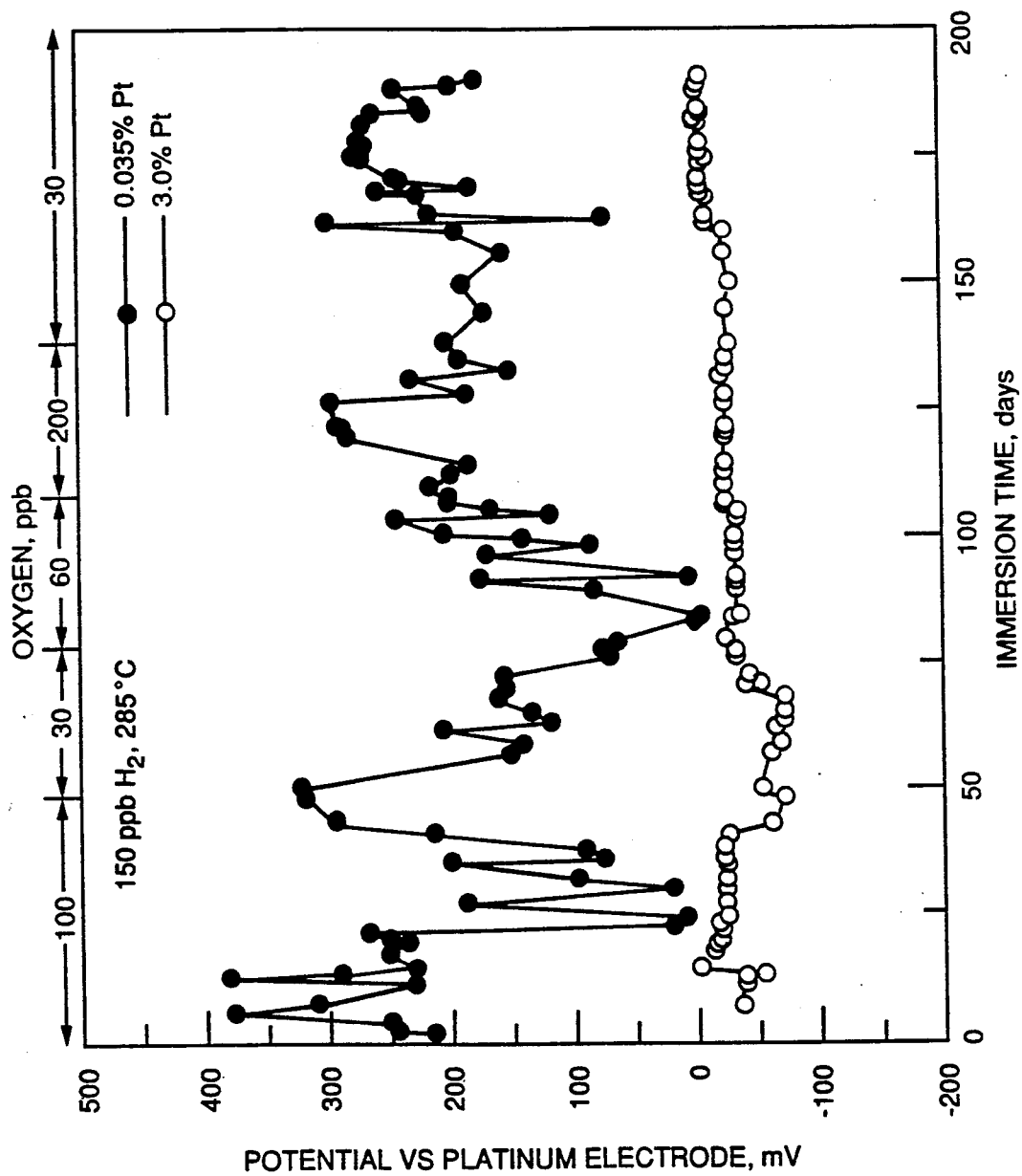

The effectiveness of the low levels of palladium or platinum solute, in test samples 1-11 from Example 1, in reducing corrosion potential was demonstrated in a series of tests. Test specimens were prepared and the corrosion potential was measured in the 285° C. water test loop as described in Example 1, however the ratio of dissolved hydrogen to dissolved oxygen in the water was varied. Results of the corrosion testing are shown in FIGS. 2-4. FIGS. 2-4 are graphs of the corrosion potential measured on the samples as compared to the platinum reference electrode, i.e., 0 is the corrosion potential of the platinum reference electrode. The oxygen level was reduced and increased in a step-wise manner over a period of days while hydrogen was maintained at 150 ppb as shown in FIGS. 2-4. The results clearly show that the alloys containing additions of palladium or platinum as low as 0.1% have a low corrosion potential about the same as the pure platinum electrode, although a short "ageing" period may be required before the surface becomes fully catalytic. Lower levels of 0.035% to 0.01% of palladium or platinum required longer "ageing" periods and reduce the corrosion potential below the critical potential.

The yield strength, tensile strength, and percentage elongation for samples 1, 3, 4 and 7 shown in Table 3, are substantially equivalent to the typical values for type 304 stainless steel shown at the bottom of Table 2.

Small amounts of palladium or platinum as a solute in an alloy, a weld metal, or as a coating can impart improved resistance to corrosion and stress corrosion cracking in high-temperature water. These additions modify the surface catalytic properties of the metal, decreasing the corrosion potential in the presence of dissolved hydrogen in water containing dissolved oxygen or other oxidents. With dissolved hydrogen provided at a sufficient level to combine with the dissolved oxygen, the corrosion potential decreases to about $-0.5$ $V_{she}$. Example 1 corrosion tests in 350 ppb dissolved oxygen show that even at levels of dissolved hydrogen slightly below what is needed to combine with the dissolved oxygen, i.e. 32 ppb, the corrosion potential drops dramatically from about 0.15 to about $-0.5$ $V_{she}$ as shown in FIG. 1. Note that about 350 parts per billion of oxygen requires about 44 parts per billion of hydrogen for complete combination of the oxygen to form water.

In the absence of the palladium or platinum additions, much higher levels of dissolved hydrogen of about 100 to 150 ppb must be added during operation of boiling water reactors to suppress the dissolved oxygen concentration typically below 10 ppb, providing a reduction in corrosion potential from about 0.1 to about $-0.3$ $V_{she}$. Since the corrosion potential is a fundamental parameter which controls susceptibility to stress corrosion cracking, the catalytic layer of a platinum group metal provides for greater resistance to cracking at much lower hydrogen addition levels, as has been demonstrated directly in laboratory stress corrosion cracking tests. This can translate to significant benefits in reducing the amount of hydrogen additions, and in reduced incorporation of $N^{16}$.

From FIGS. 2–4 it is evident that the catalytic layer of platinum or palladium reached low potentials under the catalyzed hydrogen water chemistry conditions and had a corrosion potential essentially equivalent to the potential of the platinum electrode. Both were below the range of critical potential of −230 mV to −300 mV for the prevention of stress corrosion cracking. The data obtained from the examples and plotted in FIG. 1–4 clearly demonstrate the effectiveness of the platinum or palladium solute in the stainless steel alloy. The platinum or palladium solute is deemed to be representative of any of the platinum group metals.

The effectiveness of coatings of platinum or palladium as a catalytic layer on stainless steel substrates that provide reduced corrosion potential in high-temperature water is shown in the following examples.

EXAMPLE 3

Two coupons of 316 stainless steel were prepared for testing. Both coupons were 2" long, ⅜" wide, and ⅛" thick. The surfaces of the coupons were cleaned by grit blasting with fine alumina powder and were then etched for one minute in 1:1 HCl immediately prior to a plating operation. The plating operation employed was designed to deposit palladium by electroless plating processing onto the grit blasted coupons. The electroless plating process employed was a commercial procedure of the Callery Chemical Company, of Callery, Pa., and known as "First Choice" electroless palladium P-83.

One of the two coupon samples was premounted in a Conax fitting while the other coupon was free. The electroless plating treatment was concurrent for both coupons and both were plated concurrently in the same bath. On the basis of weight change of the free sample of 4.9 milligrams, a film thickness of 0.4 μm was estimated for the unmounted sample. This thickness of deposit was assumed to be the same for both samples. The thickness falls within the range anticipated for the electroless palladium plating process. However, to determine more precisely the thickness of the palladium coating on the coupon sample, tests were made to determine thickness employing a Seiko x-ray thickness gauge which was available for this purpose. A thickness of 0.79 μm (micrometer) was determined.

The sample on the Conax fitting was immediately transferred to a test loop as described above in Example 1. The Conax mounted coupon was placed in the autoclave along with a second identical but palladium-free sample which had been used in earlier tests, and a platinized platinum electrode. The system was brought to a temperature between 280° and 285° C. and water containing 150 ppb (parts per billion) of dissolved hydrogen was circulated to flow over the specimen coupons at a flow rate of 200 milliliters per minute. Following a day's operation in this fashion, oxygen gas was also introduced into the feed water and the level of the oxygen gas was increased incrementally over a period of days.

Figure 5:
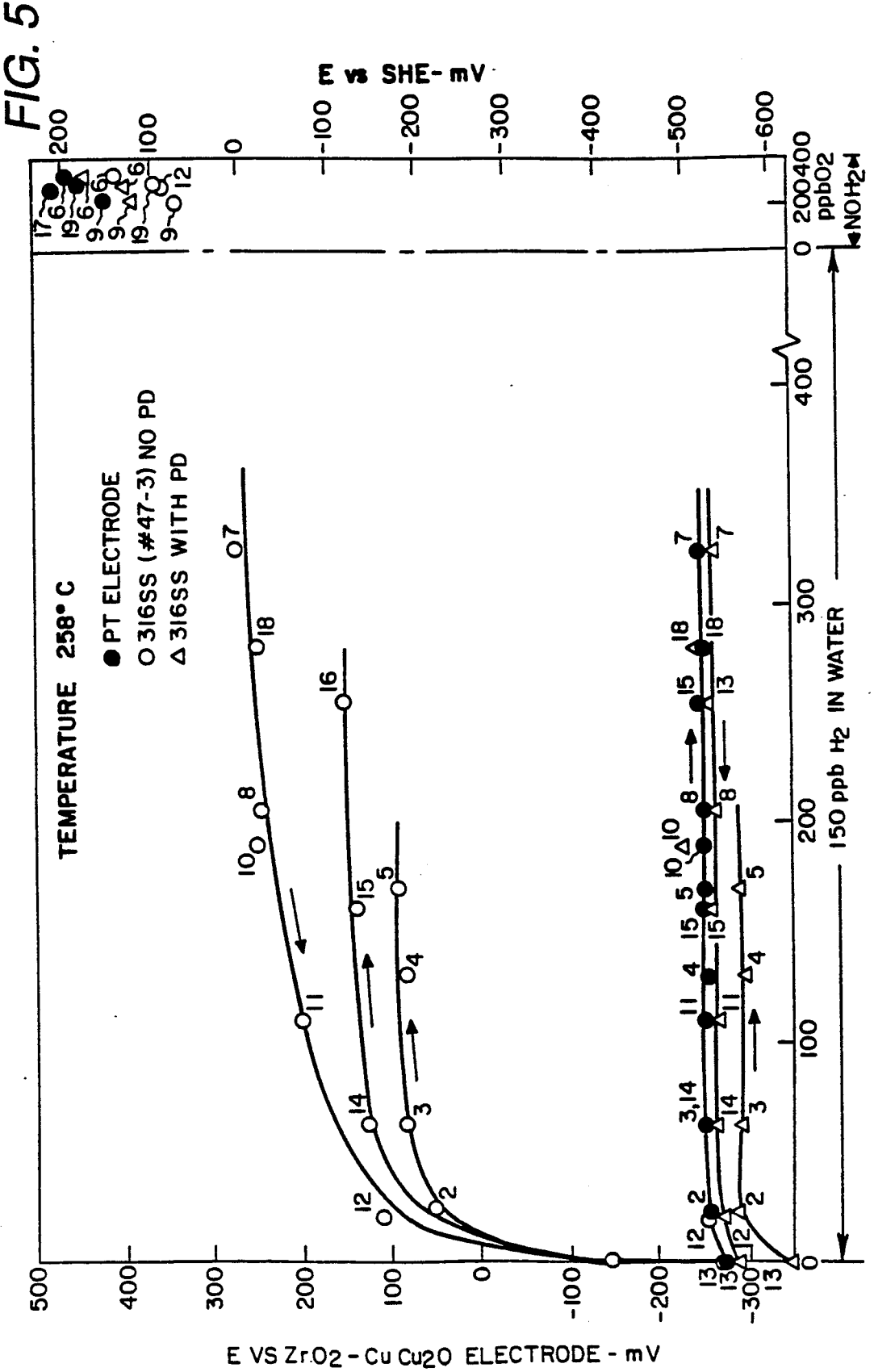
FIG. 5 is a graph in which the potential of various electrodes is plotted against oxygen concentration in water. On the left is shown data obtained with 150 ppb hydrogen also in the water. No hydrogen is present in the water used in obtaining the data in the narrow band on the right.

Corrosion potential measurements using the zirconia reference electrode as described in Example 1 were made, and data was plotted on a graph as depicted in FIG. 5. FIG. 5 is a graph in which the electrical potential is plotted against the concentration of oxygen in the test water in parts per billion of oxygen. The potentials of the two specimens and the platinum electrode, converted to the SHE (standard hydrogen electrode) scale, are shown as points 1–5 on the three separate plots representing the three different specimens on FIG. 5. As indicated by the legend, the open circles correspond to the potential of the stainless steel sample with no palladium; the filled circles to the platinum reference electrode; and the open triangles to the stainless samples coated with palladium. Following point 5, problems were encountered with the test system thus necessitating a shut-down for about a month.

The system was then restarted and operated under simulated normal water chemistry conditions. These normal water chemistry conditions correspond to 200–300 parts/billion of dissolved oxygen with no added hydrogen. The system was operated with the normal water chemistry conditions as indicated for two days before reintroducing 150 ppb dissolved hydrogen into the feed water. The data points for the system before the introduction of the hydrogen are points 6 of FIG. 5 for the three specimens.

The oxygen level was then reduced step-wise over a period of several days to zero ppb. The step-wise reduction of oxygen is represented by the points 7–13 of FIG. 5 for the three specimens. One intermediate step was taken back to normal water chemistry during this period and the data points for this step are points 9 for each of the three specimens.

While still retailing the 150 ppb dissolved hydrogen, the dissolved oxygen level was then again increased to 256 ppb and the data for these changes are data points 14–16 of the figure for each of the three specimens. After these changes, the system was again returned to normal water conditions for a period of 8 days to determine whether the normal water conditions would have a deleterious effect on the palladium treated sample. At this point, conditions were returned again to hydrogen water chemistry, i.e., to hydrogen in the water at 150 ppb and the oxygen at 325 ppb. Under these conditions, the electrical potential of the palladium-treated coupon essentially followed that of the platinum electrode as the potential moved to a low value represented by the triangular point 18 for the palladium treated coupon on FIG. 5 while the untreated stainless steel coupon (open circle point 18) did not register a low potential.

Accordingly, from the results obtained from these tests, it became evident that the palladium-treated sample reached low potentials under the catalyzed hydrogen water chemistry conditions and had electrical potential essentially equivalent to the potential of the platinum electrode. Both were below the range of critical potential of −230 mV to −300 mV for the prevention of stress corrosion cracking. During this same period, the palladium-free sample polarized to much more positive potentials even at low levels of oxygen in the presence of hydrogen. The magnitude of this polarization was greater when an operating point was approached from normal water chemistry conditions than when lower oxygen levels were prevalent in the presence of hydrogen.

The data obtained from this example and plotted in FIG. 5 clearly demonstrate the effectiveness of the palladium treatment. The palladium treatment is deemed to be representative of treatment with any of the platinum group metals. Further, from the data obtained from this test, it is believed that deposited thicknesses smaller than 0.79 μm (7900 Ångstroms) should be effective in reducing the corrosion potential of carbon steel, alloy steel, stainless steel, nickel-base alloys, and cobalt base alloys exposed to high-temperature below the critical potential. It is believed as little as 50 Ångstroms of a platinum group metal should be effective in long term exposure in significantly reducing corrosion potential and stress corrosion cracking when used in combination with hydrogen provided in stoichiometric excess of the dissolved oxygen concentration.

duced by the palladization is retained for extended periods.

Further, only marginal losses of palladium seem to have occurred as evidenced by the final column of thickness gauge data in Table 4.

TABLE 4

| Sample | Side | Palladium Thickness Measurements (micrometers) | | |
|---|---|---|---|---|
| | | Initial Values | After 7 Months of Operation | After 6 Additional Months |
| 316ss-47-3 | 1 | 0.00 ± 0.05* | 0.00 ± 0.05* | — |
| | 2 | 0.00 ± 0.05 | 0.00 ± 0.05 | — |
| 316ss-CONT-Pd | 1 | (0.78 ± 0.03)+ | 0.86 ± 0.04 | 0.79 ± 0.03* |
| | 2 | (0.79 ± 0.01) | 0.84 ± 0.04 | 0.80 ± 0.03 |

*One standard deviation
+The initial thickness measurement was obtained indirectly from a duplicate of 316ss-cont-Pd treated in parallel As can be seen from Example 5, the corrosion potential of the palladium-coated sample is comparable to the electrical potential of the platinized-platinum electrode even with more than 300 parts/billion dissolved oxygen in the feed water. It will be noted that 300 parts/billion of oxygen is equivalent to 38 parts/billion of hydrogen and therefore the hydrogen is still in stoichiometric excess.

EXAMPLE 4

Figure 6:
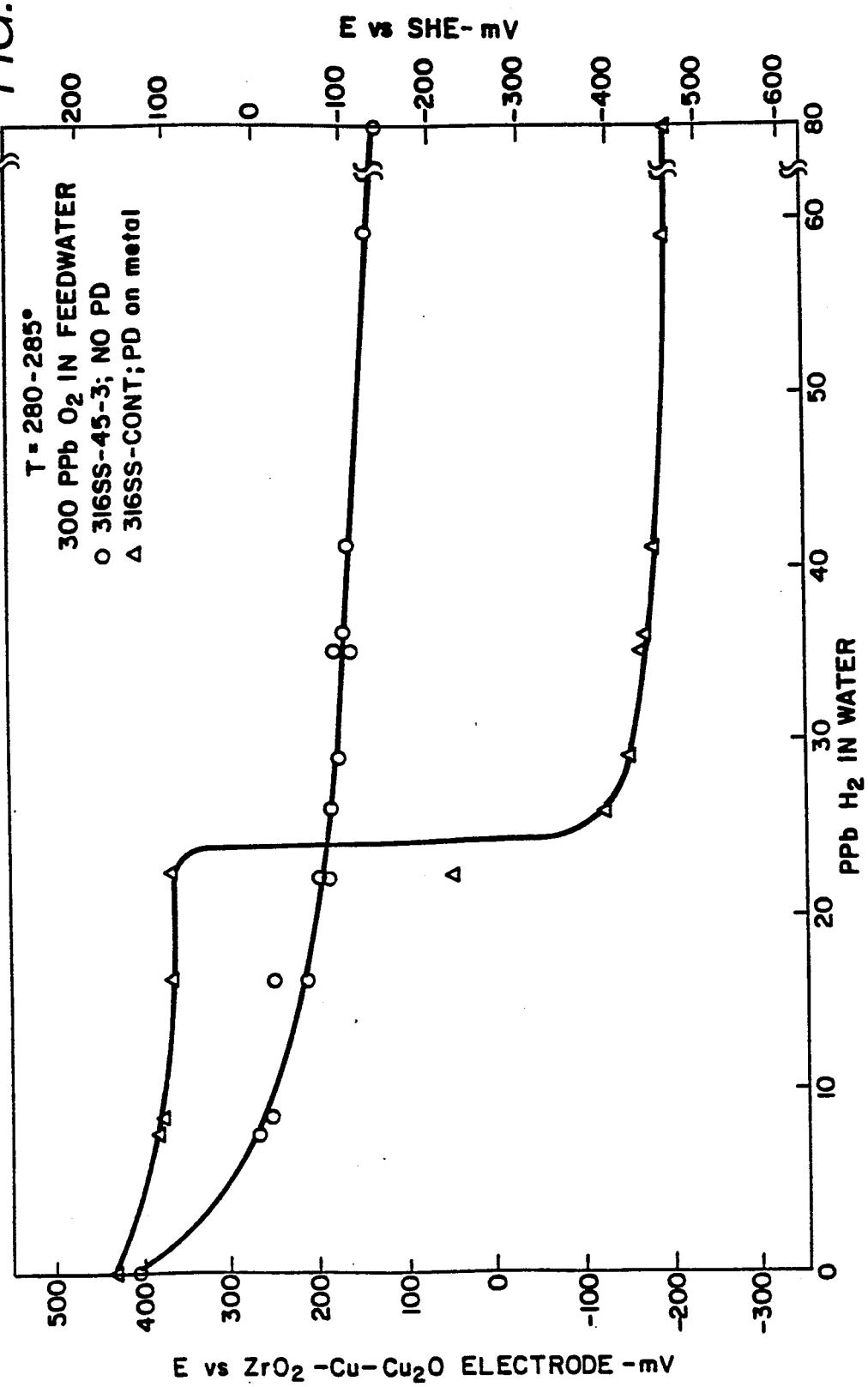
FIG. 6 is a graph in which corrosion potential is plotted against hydrogen concentration in water with 300 ppb oxygen also in the water.

In FIG. 6, the effect of palladium treatment is illustrated in a different fashion. The tests carried out which resulted in these data involved increasing the amounts of hydrogen which were added to water containing a fixed amount of oxygen rather than the reverse as was the practice in Example 3. In contrast to the unpalladinized sample, in which case only small transitions of potential occur, with palladium on the surface a large shift from the higher potential range to a low potential range occurs abruptly at about 24 ppb hydrogen. The concentration of hydrogen that is stoichiometrically equivalent to 300 ppb oxygen for the formation of water is 37.5 ppb or 1.56 times the measured amount. Since the recombination reaction is believed to occur only on the metal surface, the lower observed value for hydrogen is deemed to reflect the fact that the diffusion coefficient of hydrogen in water is considerably higher than that of oxygen. As a result, the hydrogen and oxygen in this example arrive at the electrode surface in stoichiometric ratios for the formation of water even though the ratio of hydrogen to oxygen in the bulk water is substoichiometric.

It is likely that the sharp change in potential of the catalyzed surface does indeed correspond to the point where the flux of the hydrogen and the oxygen to the electrode surface are in stoichiometric balance. From these data, we then see that with the catalyzed surface the potential can be reduced to the desired level with far less hydrogen than is required in the absence of the catalyst. It should be beneficial in reducing incorporation of nitrogen[16] in turbine buildings since there is considerable evidence that low hydrogen levels in the water result in less production of volatile nitrogen species.

EXAMPLE 5

Figure 7:
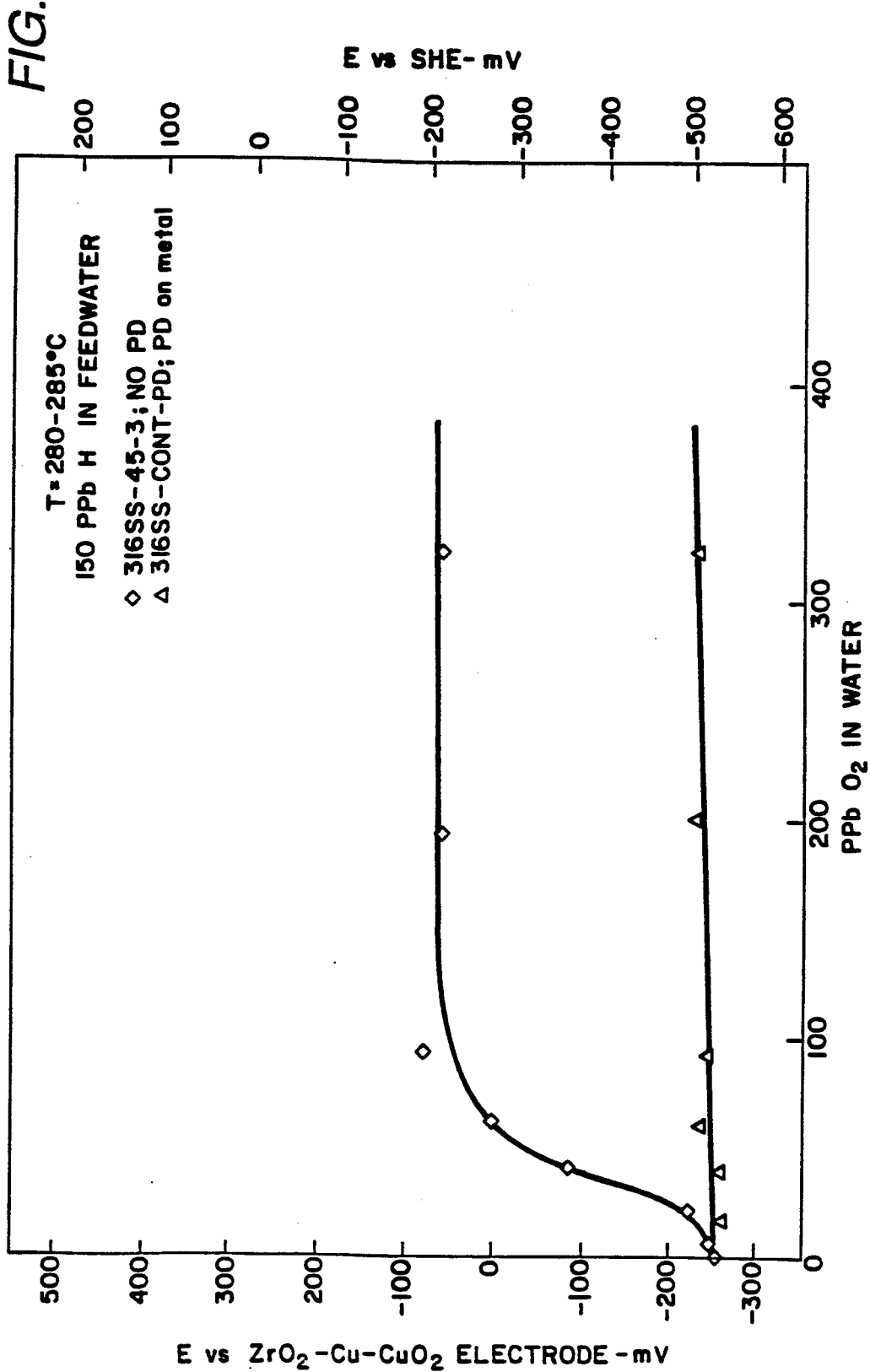
FIG. 7 is a graph similar to that in FIG. 5 in which corrosion potential is plotted against oxygen concentration in water with 150 ppb hydrogen also in the water, but following several months of operation after FIG. 5.
Figure 8:
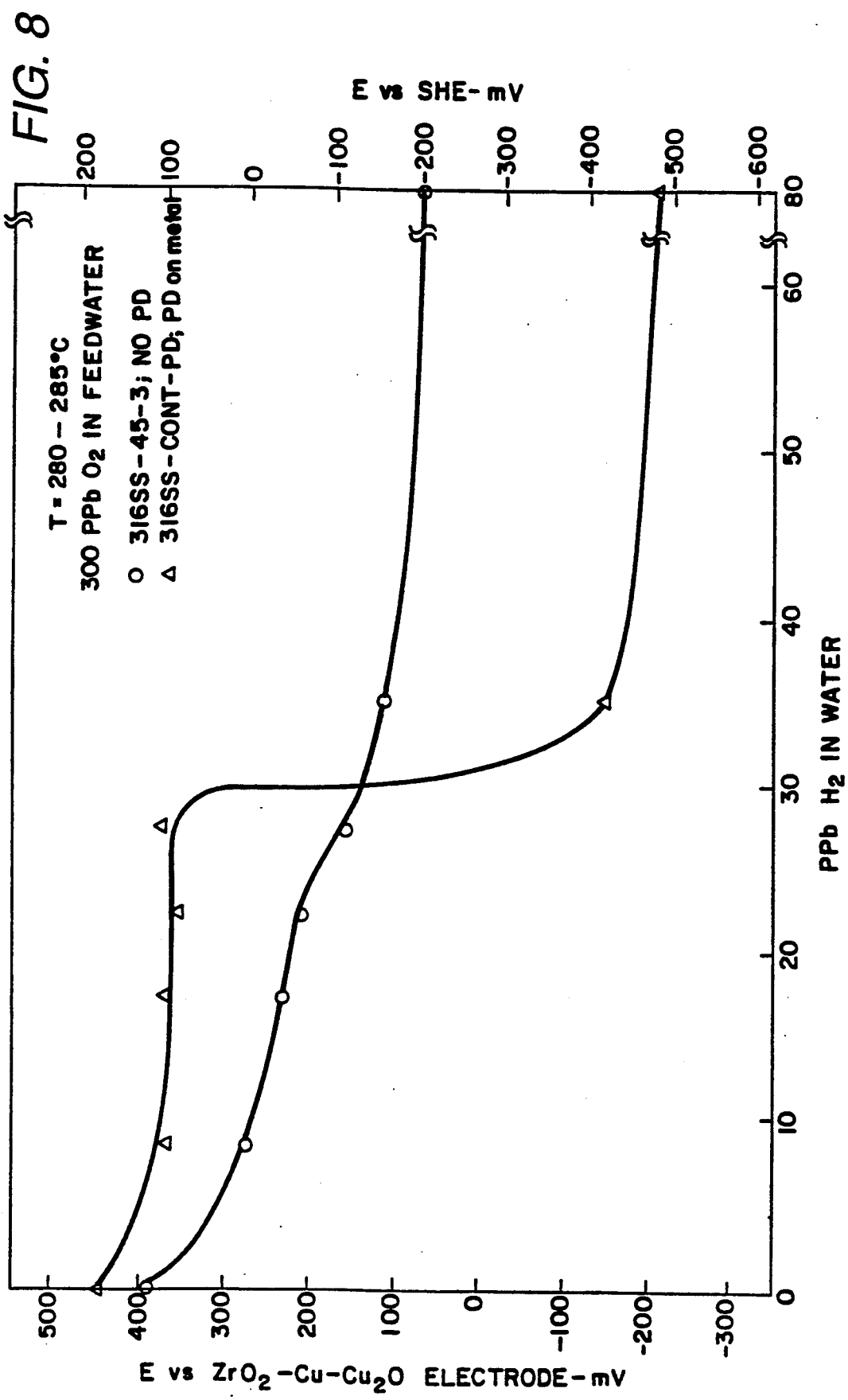
FIG. 8 is a graph similar to that of FIG. 6 above, but obtained after several months of operation of the samples tested and plotted in FIG. 6.

Two additional sets of data analogous to those of FIGS. 5 and 6 are shown in FIGS. 7 and 8. These were obtained after a total of 13 months of operation of sample SS-CONT-Pd and indicate that the behavior pro-

EXAMPLE 6

A number of constant extension rate (CERT) tests were performed in a separate system using an Instron model 1131 test machine and a small autoclave with an external silver/silver chloride reference electrode as previously described in the literature: P. L. Andresen, "*Environment-Sensitive Fracture: Evaluation and Comparison of Test Methods*", ASTM STP 821, S. W. Dean et al. Eds., Am. Soc. for Testing Materials, Philadelphia (1984) page 271, incorporated herein by reference. In order to perform the CERT testing, cylindrical tensile specimens 0.2" gauge diameter×1" length were machined from welded AISI 304 stainless steel 102 millimeter diameter schedule 80 (heat no. 04836). These pipe samples were from a group previously used in extensive work reported in the literature by Andreson. See in this regard P. L. Andresen, in EPRI Report NP-2424-LD (June 1982) page 3-3, incorporated herein by reference.

The well-sensitized specimens were further heat treated at 500° C. for 24 hours in an argon atmosphere. Sensitization was confirmed by an oxylic acid etch test. Immediately prior to use—either directly in a CERT or for pre-palladinization—the samples were polished with wet 600 grit paper. Palladinization was performed as described in Example 3, but with variations in the plating, time, and temperature.

During the tests, the water was equilibrated with a mixture of nitrogen, hydrogen, and/or oxygen. A sulfuric acid concentration of $0.3 \times 10^{-6}$ molar was maintained by injection of a more concentrated solution into the main stream at a constant rate. This supply of sulfuric acid established a conductivity of approximately 0.3 microsiemen/centimeter in the feed water to the autoclave.

The potential of the insulated sample and of the autoclave were monitored against the reference electrode throughout the tests. Before the strain was applied to the test specimens, the specimens were exposed to normal water conditions at an oxygen level of 100 or 200 ppb for about 24 hours and then to the test conditions. The test conditions provided for the same level of oxygen in the water with hydrogen also in the water. The strain rate used in all of the testing was $1 \times 10^{-6}$ per second.

After the specimens broke under tension, the fracture surface and adjacent surfaces were examined with the scanning electron microscope.

Figure 9:
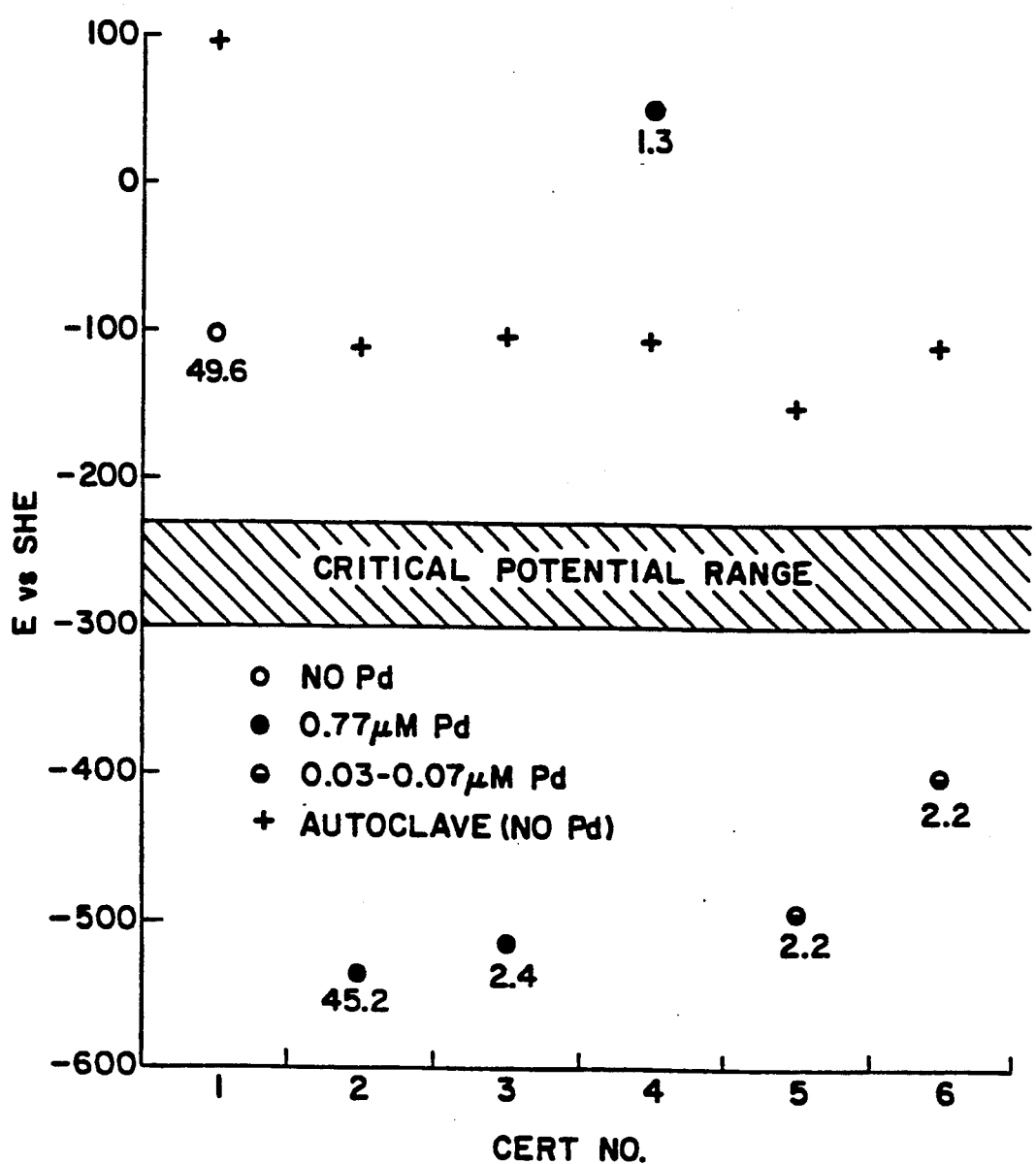
FIG. 9 is a graph in which corrosion potential relative to the standard hydrogen electrode (SHE) is summarized for a number of stress corrosion tests.

Results of these tests are summarized in Table 5. Although AISI 304 SS samples were employed for the CERTs, their potentials were in accord with those of the AISI 316 flag-type samples used for the electrochemical measurements under similar water chemistry conditions. The relation to the critical potential for protection from SCC is shown more clearly in FIG. 9. Here, it is to be noted that the potential of the AISI 316 SS autoclave remained above the critical potential in all cases because it was not palladinized.

In all of the CERTs, the oxygen concentration in the water was maintained at a much higher level than would occur under boiling water reactor operating conditions employing hydrogen water chemistry. It is also to be noted that the first two tests, which included the unpalladinized control, were performed at high hydrogen to oxygen ratios. For the remainder, the molar ratio of hydrogen to oxygen at the sample surface was held close to the stoichiometric value (2:1) for the formation of water based upon a ratio of 1.83 for the diffusion coefficients of hydrogen and oxygen. When the molar ratio at the sample surface was >2.0 the potential of the palladinized samples was well below the critical value even with only a 0.03 micrometer thick palladium coating. With a ratio of <2.0 the potential of the sample with a 0.77 micrometer thick coating was above the critical value.

Inspection of the fractured specimens with a scanning electron microscope revealed that only the unpalladinized control and the palladinized sample from test 4, which was performed with the substoichiometric ratio of hydrogen to oxygen, showed extensive intergranular stress corrosion cracking. A number of intergranular cracks were also evident on the free surface near the break in both cases. In all other tests ductile fracture occurred accompanied by some transgranular cracking on the fracture and free surfaces, as has been extensively observed in other tests at low potentials.

It is, therefore, clear that the palladium coatings were successful in facilitating the achievement of corrosion potentials lower than those of the control specimens and, indeed, below the critical value for the prevention of stress corrosion cracking even with relatively high oxygen concentrations and low hydrogen concentrations in the water. Further, this behavior was achieved and sustained with a palladium coating as thin as 0.03 micrometer. In agreement with the potentials, the control sample and the palladinized sample deliberately held at a high potential (with an $H_2:O_2$ ratio at the sample surface of <2) manifested intergranular stress corrosion cracking while the remainder of the palladinized samples did not. This clearly demonstrates that the combination of the palladium coating coupled with the presence of the injected hydrogen is responsible for the improved behavior.

What is claimed is:

1. A method of lowering the corrosion potential of a component formed from an alloy from the group consisting of carbon steel, alloy steel, stainless steel, nickel-based alloys, and cobalt-based alloys, and exposed to high-temperature water comprised of oxidizing species that substantially increase the corrosion potential of the component, the method comprising: forming the component to have a catalytic layer of a platinum group metal, and providing a reducing species that can combine with the oxidizing species in the water to reduce the corrosion potential of the component.

2. The method of claim 1 wherein the reducing species is hydrogen.

3. The method of claim 2 wherein the catalytic layer is a solute of about 0.01 to 5 atomic percent of the alloy.

4. A method of reducing stress corrosion cracking of a component formed from an alloy from the group consisting of carbon steel, alloy steel, stainless steel, nickel-based alloys, and cobalt-based alloys, and exposed to high-temperature water comprised of oxidizing species, the method comprising: forming the component to have a catalytic layer of a platinum group metal, and providing a reducing species that can combine with the oxidizing species in the water to reduce the corrosion potential of the component below a critical potential.

5. The method of claim 4 wherein the reducing species is hydrogen.

6. The method of claim 5 wherein the catalytic layer is a solute of about 0.01 to 5 atomic percent of the alloy.

7. A method of reducing stress corrosion cracking of a nuclear reactor component formed from an alloy from the group consisting of carbon steel, alloy steel, stainless steel, nickel-based alloys, and cobalt-based alloys, and exposed to high-temperature water comprised of oxidizing species, the method comprising: forming the component to have a catalytic layer of a platinum group metal, and providing a reducing species that can combine with the oxidizing species in the water to reduce the corrosion potential of the component below a critical potential.

8. The method of claim 7 wherein the reducing species is hydrogen.

9. The method of claim 8 wherein the catalytic layer is a solute of about 0.01 to 5 atomic percent of the alloy.

* * * * *